(12) United States Patent
Niiranen

(10) Patent No.: US 7,964,065 B2
(45) Date of Patent: Jun. 21, 2011

(54) SCREEN STRUCTURE FOR USE IN THE MANUFACTURE OF A FIBER PRODUCT

(75) Inventor: Heikki Niiranen, Hameenlinna (FI)

(73) Assignee: Anpap Oy, Valkeakoski (FI)

( * ) Notice: Subject to any disclaimer, the term of this patent is extended or adjusted under 35 U.S.C. 154(b) by 699 days.

(21) Appl. No.: 10/569,924

(22) PCT Filed: Aug. 20, 2004

(86) PCT No.: PCT/FI2004/000491
§ 371 (c)(1),
(2), (4) Date: Apr. 13, 2007

(87) PCT Pub. No.: WO2005/021865
PCT Pub. Date: Mar. 10, 2005

(65) Prior Publication Data
US 2007/0240843 A1 Oct. 18, 2007

(30) Foreign Application Priority Data
Sep. 1, 2003 (FI) .................... 20031228

(51) Int. Cl.
*D21D 5/06* (2006.01)
*D21D 5/16* (2006.01)
*B07B 1/22* (2006.01)

(52) U.S. Cl. ........... 162/251; 162/55; 210/498; 210/499
(58) Field of Classification Search .......... 162/55, 162/251; 209/17, 270, 273, 288, 397, 303; 210/498, 499; 29/896.62
See application file for complete search history.

(56) References Cited

U.S. PATENT DOCUMENTS

| | | | |
|---|---|---|---|
| 3,581,903 A * | 6/1971 | Holz | 210/415 |
| 4,898,665 A * | 2/1990 | Lamort | 209/273 |
| 5,259,512 A * | 11/1993 | Czerwoniak | 209/273 |
| 5,384,944 A * | 1/1995 | Minichshofer | 28/115 |
| 5,607,589 A * | 3/1997 | Frejborg | 210/415 |
| 6,119,867 A * | 9/2000 | Ljokkoi et al. | 209/273 |
| 7,168,570 B2 * | 1/2007 | Frejborg | 209/283 |

FOREIGN PATENT DOCUMENTS
WO WO 87/04474 A1 6/1987
WO WO 93/07334 A1 4/1993

\* cited by examiner

*Primary Examiner* — Eric Hug
(74) *Attorney, Agent, or Firm* — Hoffmann & Baron, LLP

(57) ABSTRACT

The present invention relates to a method and apparatus for feeding chemical into a liquid flow. The method and apparatus according to the invention are especially suitable for applications where very small volumes of chemical must be fed in precise amounts in large process liquid flows.

5 Claims, 3 Drawing Sheets

Prior art

SCREEN STRUCTURE FOR USE IN THE MANUFACTURE OF A FIBER PRODUCT

This application is the U.S. National Phase of International Application Number PCT/FI2004/000491 filed on 20 Aug. 2004, which is incorporated herein by reference.

BACKGROUND OF THE INVENTION

The present invention relates to a screen structure as defined in the preamble of claim 1 for use in the manufacture of a fiber product.

The screen structure of the invention is applicable for use directly as such or with minor changes in different stages of the production process of a fiber product, such as paper. The screen structure of the invention is particularly well suited for use in dry formation of a web material. In the dry formation process referred to, a distribution unit, i.e. a so-called former is used, which generally has an even number of screen tubes. The screen tube of the former is typically a cylindrical tube whose envelope surface is e.g. a substantially thin perforated plate bent into a cylindrical form, the fiber material being spread by suction through these perforations onto a forming wire below the screen tube in a direction transverse to the direction of motion of the forming wire. The fiber layer formed on the forming wire can be made more uniform by using an even number of transverse screen tubes and blowing a fiber flow in opposite directions in alternate screen tubes.

The screen structure of the invention is also applicable for use in a hammer mill, which is generally placed before the former and in which the fiber web is reduced to fibers of suitable size before the fiber flow is passed to the former. In this case, the cylindrical envelope of the hammer mill is an envelope surface made from a bent perforated plate, corresponding to the screen tube of the former.

The screen structure of the invention is also applicable for use in classifiers used for the sorting of pulp in paper and pulp industry.

In prior art, screen plate structures are known which have been used in the above-mentioned applications, among others, in conjunction with paper production. One of the prior-art solutions is a tube with a smooth inner surface and perforations in its envelope. This solution has proved in practice to be insufficient in capacity in conjunction with faster and faster machines. Previously known are also screen tube structures the envelope of the screen tube has narrow elongated slits instead of round holes. This solution, too, is insufficient to provide a capacity that meets the present-day requirements.

To remedy the capacity problem referred to, new screen plate solutions have been developed paying attention to the cross-sectional profile of the inner surface of the screen tube, among other things. For example, Finnish patent no. FI67588, corresponding to U.S. Pat. No. 4,529,520, discloses a screen tube structure in which the inner surface of the screen tube is provided with axially extending grooves in which the upstream-side lateral surfaces are preferably substantially perpendicular to the envelope curve of the screen surface while the downstream-side lateral surfaces are inclined relative to the aforesaid plane. The bottoms of the grooves are provided with apertures or slits going through the bottom of the groove substantially at the middle of the bottom of the groove as seen in cross-section.

The above-mentioned screen tube solution and other corresponding solutions are illustrated in more detail in FIG. 1, which presents a prior-art screen tube structure comprising a screen tube bent from a plate 1a, the inner surface of the tube being provided with grooves 4a extending in the axial direction of the tube. The first lateral surface 5a of each groove 4a is at an inclined angle relative to the envelope curve 10a of the inner surface of the tube, while the second lateral surface 7a is at a substantially right angle. Correspondingly, the bottom 6a of the groove 4a is substantially parallel to the envelope curve 10a. The openings 2a going through the plate 1a are so located on the planar bottom 6a of the grooves 4a that a threshold forming corner 8a remains between the edge 3a of the opening 2a and the second lateral surface 7a of the groove 4a. A similar threshold also remains between the opening 2a and the first lateral surface 5a.

In prior-art solutions, the fiber flow in screen tubes formed like this can be handled so that the fiber flow or a corresponding mass flow inside the screen tube is in relative motion with respect to the lower surface of the screen plate either in direction B as indicated in FIG. 1 or in the opposite direction A. In most dry formation applications, direction B, in which the trailing surface of the groove 4a, i.e. the lateral surface 7a on the upstream side is substantially perpendicular while the receiving surface, i.e. the lateral surface 5a on the downstream side is inclined relative to the envelope curve, has proved to be inferior to direction A in respect of capacity.

Correspondingly, screen structure solutions in which the fiber flow moves in direction A have the drawback that the threshold forming corner 8a causes turbulence in the fiber flow in dry formation, such turbulence being an obstacle to smooth passage of fibers through the apertures 2a. Therefore, this solution does not provide the best possible throughput capacity, either. In other words, the main problem with this screen plate structure, too, is insufficient capacity, especially in dry formation of a web, so the former should be provided with a plurality of successive screen tube pairs to achieve a sufficient capacity.

SUMMARY OF THE INVENTION

The object of the present invention is to overcome the above-mentioned drawbacks and create an efficient screen structure that is reliable in operation and enables a good capacity to be achieved in conjunction with paper production. The screen structure of the invention is characterized by what is disclosed closed in the characterization part of claim 1. Other embodiments of the invention are characterized by what is disclosed in the other claims.

The solution of the invention has the advantage that the screen structure of the invention makes it possible to achieve a high capacity at different stages of the paper production process. When the screen structure of the invention is used in the hammer mill, in the screen tube of the former or in the classifier, a throughput capacity corresponding to the capacity of the apparatus as a whole can be achieved with a minimum number of units. For example, to achieve the same capacity level, a substantially smaller number of former screen tubes or screen tube pairs are needed.

BRIEF DESCRIPTION OF THE DRAWINGS

In the following, the invention will be described in detail with reference to an embodiment example and the attached drawings, wherein.

DETAILED DESCRIPTION OF THE INVENTION

Figure 2:
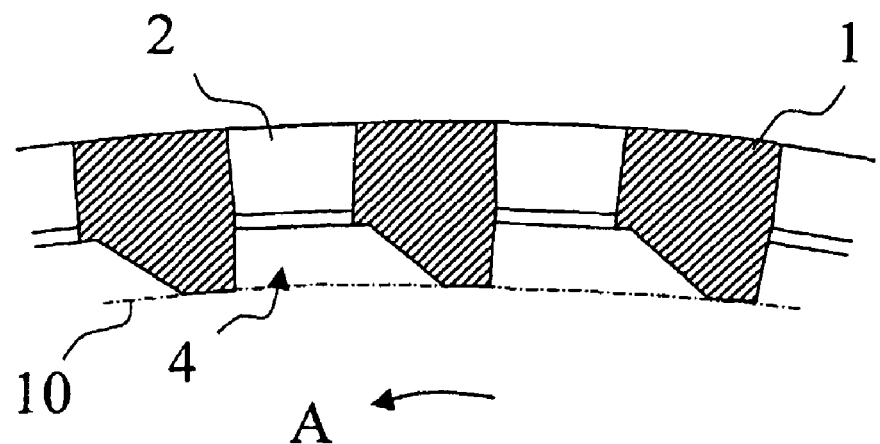
FIG. 2 presents a cross-sectional view of a part of the screen structure of the invention.
Figure 3:
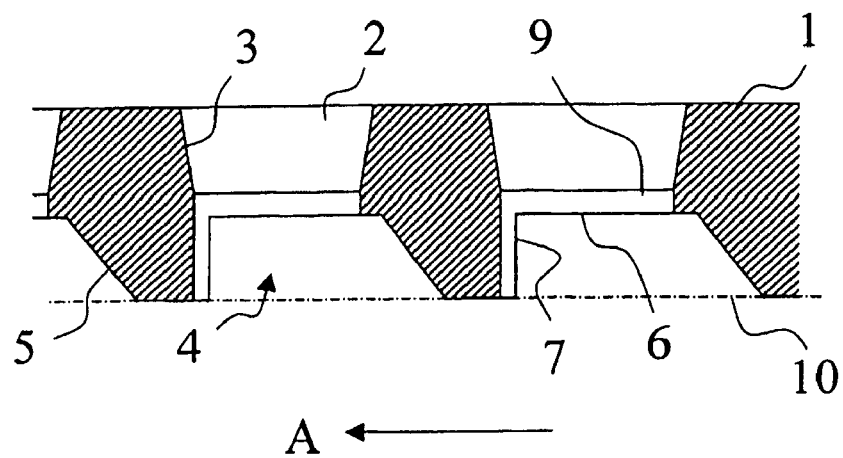
FIG. 3 presents a cross-sectional view of a magnified part of the screen structure of the invention.
Figure 4:
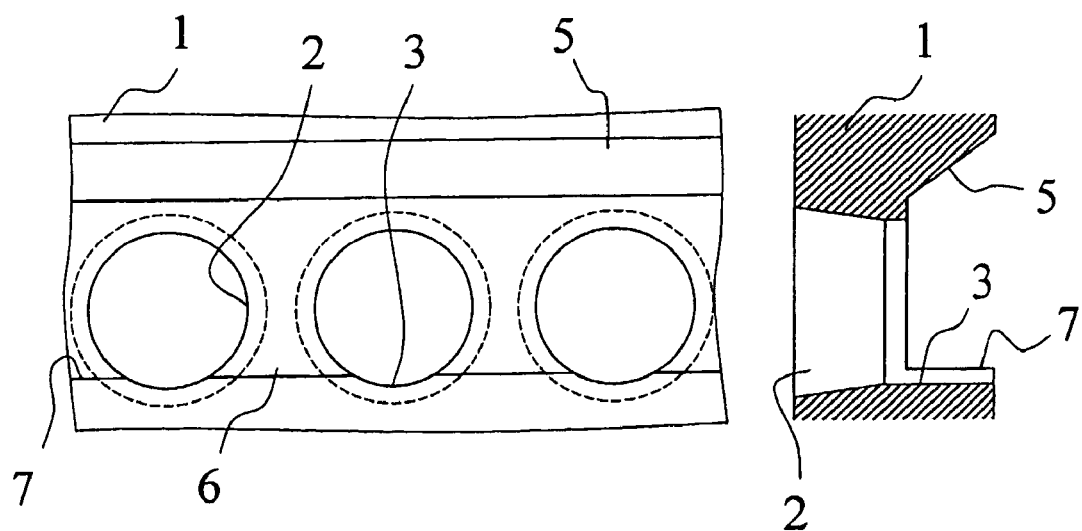
FIG. 4 presents a cross-sectional top view of a magnified part of the screen structure of the invention.

FIG. 2 presents a screen structure according to the invention as applied to a screen tube, whereas FIGS. 3 and 4 present the same structure in a larger view and before the bending of the screen plate 1 to form the envelope of the tube. The screen structure illustrated in FIG. 2-4 comprises a screen plate 1, which in FIG. 2 has been bent to form a screen tube as stated above. The inner surface of the screen tube is provided with grooves 4 extending in the axial direction of the tube. The first lateral surface, i.e. in an embodiment according to the invention the lateral surface 5 located on the upstream side relative to the fiber flow, is at an inclined angle to the envelope curve 10 of the inner surface of the tube while the second lateral surface 7, i.e. the lateral surface on the downstream side is at a substantially right angle to the envelope curve 10. Correspondingly, the bottom 6 of the groove 4 is substantially parallel to the envelope curve 10. The apertures going through the screen plate 1 are placed in rows of apertures so located in relation to the planar bottom 6 of the grooves 4 that the downstream-side part, in short the back part 3 of each aperture 2 extends at the depth of the bottom 6 of the groove 4 past the downstream-side lateral surface 7 of the groove 4 in the forward direction of the fiber flow. In other words, at the depth of the bottom 6 of the groove, the back part 3 of the aperture forms a sector-like part extending away from the lateral surface 7 of the groove 4 in the forward direction of the fiber flow.

The maximum reach of the back part 3 of the aperture away from the lateral surface 7 of the groove 4, i.e. the thickness of the sector-like part need not be so accurately dimensioned that it would always be the same for all apertures and rows of apertures. It suffices to have the maximum reach within a range starting outward from the lateral surface 7 of the groove 4, and thus a special case is one in which the maximum reach is zero. In this special case, the back part 3 of the aperture 2 is located at the depth of the bottom 6 of the groove 4 at the level of the downstream-side lateral surface 7 of the groove 4 in the forward direction of the fiber flow. In other words, the downstream-side back part 3 of the aperture 2 extends at the depth of the bottom 6 of the groove 4 at least to the level of the downstream-side lateral surface 7 of the groove 4 in the forward direction of the fiber flow.

In the above-described solution according to the invention, no corner or threshold remains between the back part 3 of the aperture 2 and the downstream-side lateral surface 7 of the groove 4, so that the substantially uniform back part 3 of the aperture extends through the entire thickness of the screen plate 1.

The cylindrical part 9 visible in FIG. 2-4 between the conical part of the aperture 2 and the groove 4 is not strictly necessary. However, it is advantageous in present-day manufacturing technology where a bore cutter is used that has a cylindrical tip part and changes to a conical form after the said cylindrical part. Therefore, the shape of the aperture 2 is such that the downstream-side back part 3 of the aperture 2 extends continuously through the entire screen plate 1 so that on the opposite side of the groove 4 the aperture 2 is at first conical, becoming cylindrical towards the bottom 6 of the groove. At the same time, a preferable placement of the aperture is such that the back part 3 of the aperture extends both at the depth of the bottom 6 of the groove 4 and in the inner surface of the screen plate 1 past the downstream-side lateral surface 7 of the groove 4 in the forward direction of the fiber flow.

Figure 5:
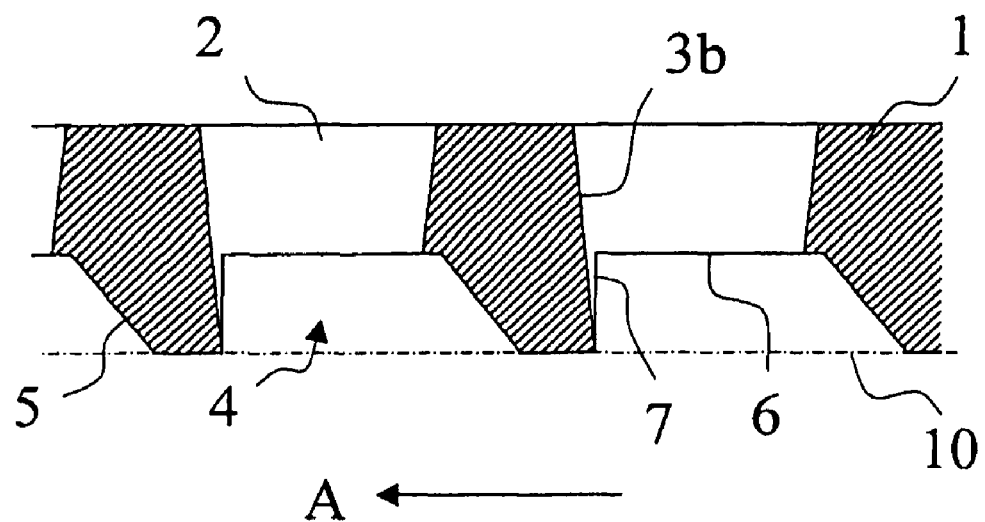
FIG. 5 presents a cross-sectional view of a magnified part of a screen structure according to a second embodiment of the invention.

FIG. 5 presents a screen structure according to a preferred embodiment of the invention, wherein the aperture 2 going through the screen plate 1 has been bored in such manner that the downstream-side back part 3b of the aperture 2 extends at the bottom 6 of the groove 4 outside the bottom 6 of the groove, so it is no longer completely located on the bottom 6 of the groove. In other words, the downstream-side back part 3b of the aperture 2 extends at the depth of the bottom 6 of the groove 4 past the downstream-side lateral surface 7 of the groove 4 in the forward direction of the fiber flow. In addition, the angle formed between the downstream-side back part 3b of the aperture and the envelope curve 10 of the tube is substantially below 90°, because the bore of the aperture 2 is conical so that the diameter of the aperture is smaller at the inside of the tube than at the outside of the tube. This shape of the downstream-side back part 3b of the aperture allows a very good passage of fibers through the aperture because the back part 3b is inclined in the entry direction of the fiber flow.

In the embodiment presented in FIG. 6, the aperture 2 is identical and located at the same place relative to the groove 4 as in the solution illustrated in FIG. 5, but in this case the downstream-side lateral surface 7b of the groove 4 is also in an inclined position relative to the envelope curve 10 of the tube, the angle between the lateral surface 7b and the envelope curve 10 of the tube being thus substantially below 90°. A screen tube implemented according to this solution has the best throughput capacity, but the screen structure is more difficult to manufacture than the above-mentioned solutions due to the accuracy requirements regarding the cutting of the grooves. It is therefore difficult to have the lateral surface 7b of the grooves cut afterwards correctly placed with respect to the back part 3b of the apertures 2.

Figure 6:
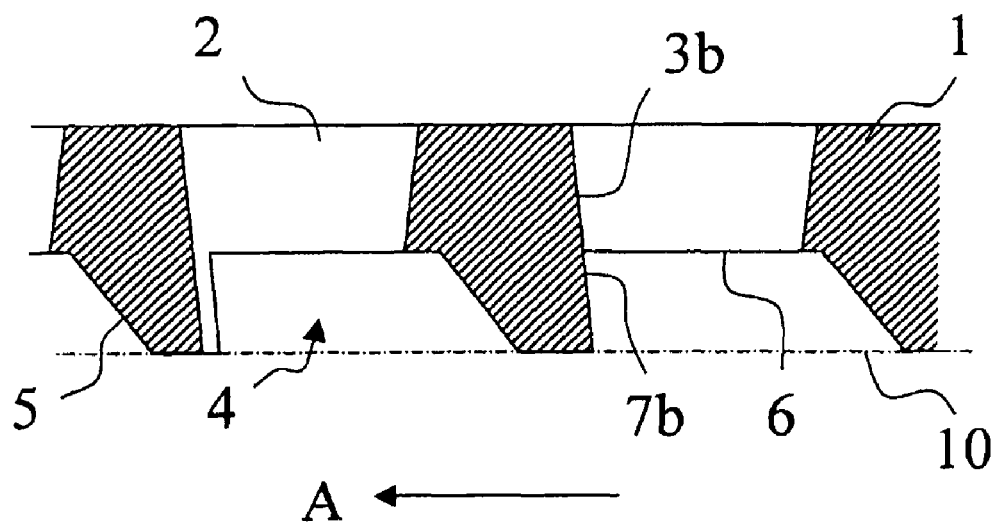
FIG. 6 presents a cross-sectional view of a magnified part of a screen structure according to a third embodiment of the invention.

In FIG. 6, the back part 3b of the right-hand side aperture is at the depth of the bottom 6 of the groove 4 in the same line with the lateral surface 7b with respect to the forward direction of the fiber flow, whereas the next row of apertures on the left has been displaced in relation to the groove 4 so that the back part 3b of the aperture extends both at the depth of the bottom 6 of the groove 4 and at the inner surface of the screen plate 1 past the lateral surface 7b of the groove in the forward direction of the fiber flow.

Figure 1:
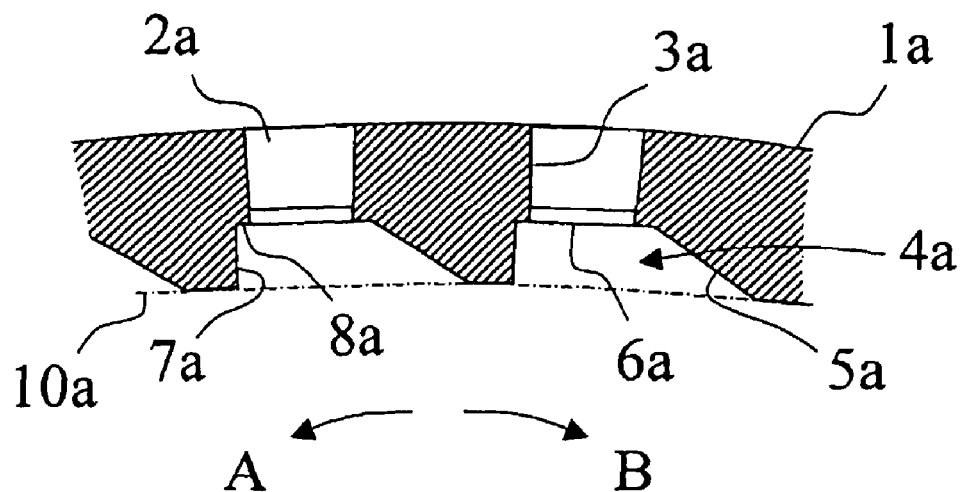
FIG. 1 presents a cross-sectional view of a part of a prior-art screen structure.

The essential point about the invention is that, on the side of the downstream-side lateral surface 7, 7b of the groove, there remains no threshold 8a causing turbulence in the fiber flow and therefore impeding the passage of fibers as shown in FIG. 1, which presents prior-art screen structure solutions.

It is obvious to the person skilled in the art that the invention is not limited to the embodiment example described above, but that it may be varied within the scope of the claims presented below. Thus, the angles of the lateral surfaces of the grooves 4 and the positions and conicalness of the apertures 2 may differ from the above description. The apertures may be e.g. completely cylindrical, in which case they will be easier to produce than conical apertures.

It is also obvious to the skilled person that the downstream-side back part 3, 3b of the apertures may be located e.g. more towards the forward direction of the fiber flow than is shown in the figures and embodiment examples. The downstream-side back part of the apertures 2 may extend e.g. completely through the screen plate 1 and be located in the inner surface of the screen plate 1 either at the level of the downstream-side lateral surface 7, 7b of the groove 4 or extending past the lateral surface to the downstream side, i.e. in the forward direction of the fiber flow. Likewise, the apertures 2 may be either round or elongated. Moreover, the depth of the grooves 4 in relation to the thickness of the screen plate may vary, and also the thickness of the plate may vary from the above description.

The invention claimed is:

1. A screen structure for use in the manufacture of a fiber product, said screen structure comprising:
    a screen tube with an envelope including a screen plate, the inner surface of said screen plate being provided with grooves extending substantially in the axial direction of the screen tube, said grooves having at least a downstream-side lateral surface and a bottom, and said screen plate being provided with apertures, wherein a downstream-side back part of the aperture extends at the depth of the bottom of the groove past the downstream-side lateral surface of the groove in the forward direction of the fiber flow.

2. A screen structure according to claim 1, wherein the downstream-side back part) of the aperture extends through the entire screen plate and that the back part extends at the depth of the bottom of the groove past the downstream-side lateral surface of the groove in the forward direction of the fiber flow.

3. A screen structure according to claim 1, wherein the downstream-side back part of the aperture extends continuously through the entire screen plate in such manner that on the opposite side of the groove the aperture is at first conical, becoming cylindrical before the bottom of the groove, and that the back part extends in the inner surface of the screen plate past the downstream-side lateral surface of the groove in the forward direction of the fiber flow.

4. A screen structure according to claim 1, wherein the downstream-side back part of the aperture extends in a straight and continuous form in an inclined position relative to the envelope curve through the entire screen plate and that the back part extends at the depth of the bottom of the groove past the downstream-side lateral surface of the groove in the forward direction of the fiber flow.

5. A screen structure according to claim 4, wherein the downstream-side back part of the aperture extends in the inner surface of the screen plate past the downstream-side lateral surface of the groove in the forward direction of the fiber flow.

* * * * *